June 26, 1934.  W. HENDRY  1,964,119
PORTABLE TIRE WHEEL LIFTING APPARATUS AND THE LIKE
Filed July 17, 1933
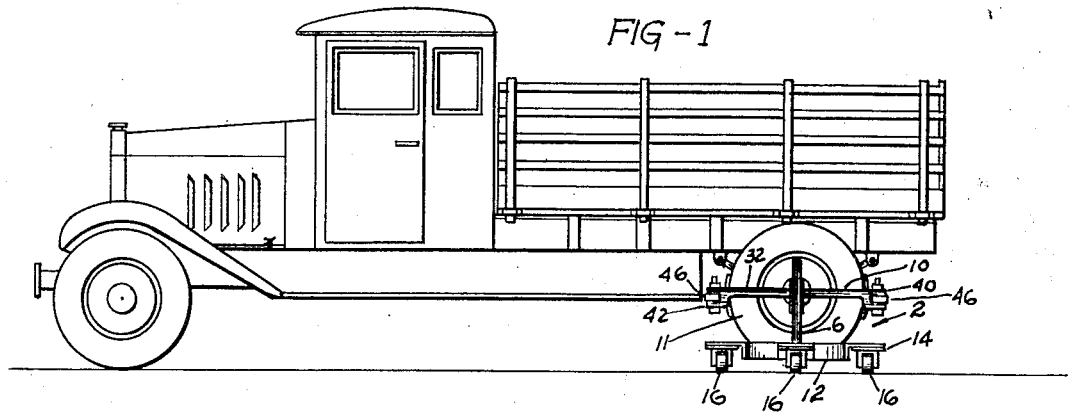
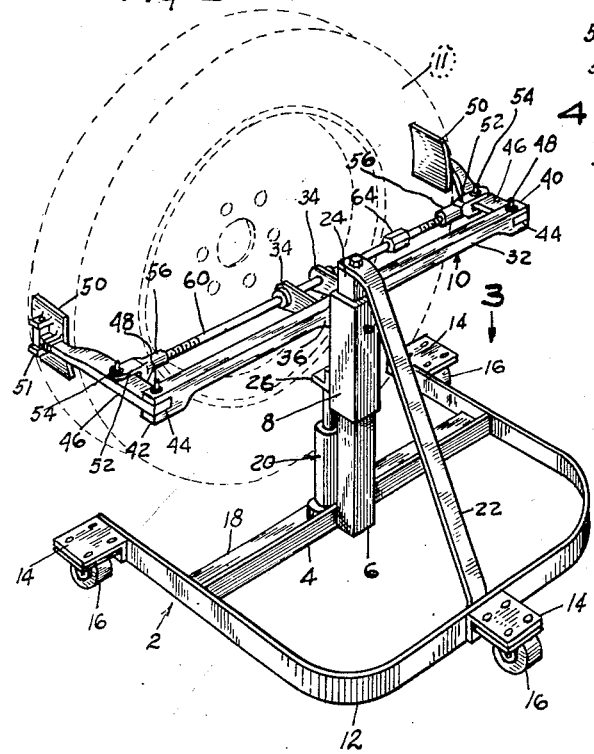
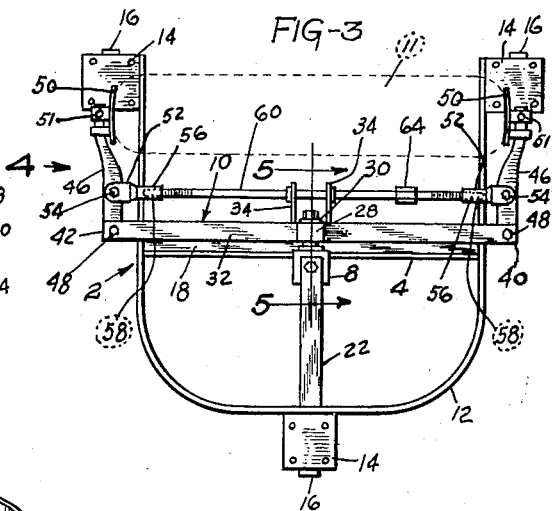
INVENTOR.
William Hendry
BY
Joseph F. M. Palen
ATTORNEY.

Patented June 26, 1934

1,964,119

UNITED STATES PATENT OFFICE 1,964,119

PORTABLE TIRE WHEEL LIFTING APPARATUS AND THE LIKE

William Hendry, Santa Barbara, Calif.

Application July 17, 1933, Serial No. 680,819

5 Claims. (Cl. 254—2)

My invention relates to the portable tire wheel lifting apparatus and more particularly to devices which are of special design and construction, adapted for holding and lifting the said tire wheel off and from the axle, and which is adapted to transport said wheel to a place where it may be repaired or exchanged for a new one, and therefore saving considerable amount of time, which now, under the present system or method, requires several hours to do the work including extra help, because the said tire wheel in many instances exceeds 300 lbs. per each wheel.

It accordingly is an object of my invention to provide said device simple in construction and easy to manufacture, which is provided with means adapted to hold said tire wheel in position which is equipped with a lifting means for the purpose of lifting said tire wheel off and from the said wheel axle, and which is also provided with rolling means by means of which said device together with the tire wheel held therein in place, may be wheeled away, thus greatly facilitate the exchange of the tire wheel, its repair or an adjustment or repair of the wheel axle.

Further object of my invention is to provide said apparatus with a center post, upon which the pivoting means of the tire wheel clamping device is positioned, which is for the purpose of allowing said tire wheel to be easily lifted and taken off the wheel axle, or replaced therein by pivoting said wheel in place, and therefore eliminating to a great extent the adjustments and various manipulations, which are now required, while replacing said wheel upon the wheel axle.

Further objects and advantages of my invention as will hereinafter more fully appear, I attain by the construction shown illustrated on the drawing and described in the specification forming a part of my application.

Reference is had to the accompanying drawing, in which the similar reference characters denote the similar parts.

In the drawing:

Fig. 1 is the rear elevational view of my invention, shown in position, and in relation with the truck, while its wheel is being removed.

Fig. 2 shows the perspective view of my invention in adjusted position, adapted to receive the tire wheel.

Fig. 3 is the top view of the tire wheel removing apparatus, taken in the direction of the arrow 3, of Fig. 2.

Fig. 4 is a side elevational view of the apparatus, shown in the direction of the arrow 4, of Fig. 3.

Fig. 5 shows the transverse cross sectional view of the center post of said apparatus, taken on the line 5—5, of the Fig. 3.

Describing my invention more in detail, said invention comprises a frame, generally designated by numeral 2, having a cross bar member 4 connected to said frame 2, upon which an upright center bar 6 is positioned, which is provided with a sleeve member 8 to which the rotatable clamping member 10 is connected and which is adapted to hold the tire wheel 11 in position, while removing or replacing it upon the wheel axle.

The said frame 2, comprises a supporting band 12 made out of flat iron bar material and which semi-encompass the said center bar member 6, having a plurality of brackets 14 connected thereto which are equipped with conventional swivel rollers 16, so that when in use, said frame 2 together with the tire wheel 11 may be moved around and to a convenient place, while an exchange or repair of said tire wheel 11, is being made.

For the purpose of rigidity, I have provided said frame 2 with a cross bar member 4, which is provided with a ledge 18 upon which an elevating device 20 is positioned, and to which the said upright center bar 6 is connected, being supported in upright position by means of a bracket member 22, which is connected at one end to the top 24 of said center bar 6 and having the other end connected to the band 12, as shown in Figs. 2 and 4.

The said center bar 6 is provided with a sleeve member 8, having a bracket 26 connected thereto and adapted to be engaged by the said elevating device 20, also, having a pivoting boss 28 positioned above said bracket 26, which is adapted to receive and hold in position the said clamping member 10, being held therein in place by means of a washer 30, as shown in Fig. 5.

The said clamping member 10 comprises a cross member 32 having a pair of brackets 34 and a boss 36 positioned between said brackets, which is provided with a socket 38 and adapted to be rotatably associated with the said pivoting boss 28, also having the ends 40 and 42, respectively, provided with a slot 44 wherein the side arms 46 are hingedly connected and held therein in place by means of a bolt 48.

Said side arms 46 are provided with a palm member 50 upon its end as at 51, which are for the purpose of holding the said tire wheel in place, and for the purpose of adjusting the said arms 46 and said palm members 50 over the said tire wheel 11, I have provided said arms 46 with a fork 52 which is hingedly connected thereto as at 54, having an extension 56 provided with a threaded hole 58 and adapted to receive therein the threaded ends of an adjusting rod 60 which is held in place by means of said brackets 34, as shown in Figs. 2 and 3.

In order to adjust said palm members 50 over said tire wheel 11, I have provided each of said forks 52 with a threaded hole 58 which are oppositely threaded, also, the adjusting rod 60 is provided with its ends 62 threaded to fit the respective hole 58 of the said fork 52, and for the purpose of making said adjustments, I have provided said adjusting rod 60 with a nut 64, so that by turning said nut 64 in the direction required for adjustment, said forks 52 will draw said side arms 46 toward the center allowing said palms 50 to grip tightly the said tire wheel 11.

When the said tire wheel 11 is properly secured and held in place by means of said palms 50, the apparatus may be then wheeled removing said wheel 11 of the wheel axle, then by manipulating the elevating device 20 said wheel 11, may be let down and released from the grip of the said palms 50, whereupon the proper adjustments or repairs of the wheel 11 may be made.

While I have thus described my invention with great particularity it will be clear that the same may be modified to meet various and special requirements.

I accordingly do not propose to be limited to the exact details of construction herein shown and described, but reserve the right in practice to make the necessary changes which may come within the scope of the appended claims.

I claim as my invention;

1. In the apparatus of the class described, adapted for removing the tire wheel off the wheel axle, comprising a frame, means connected to said frame to hold it in rigid position, means connected to said frame adapted to hold rotatably said tire wheel and a set of swivelled rollers connected to said frame adapting said frame together with said tire wheel held therein to be removed from the wheel axle.

2. In the apparatus of the class described adapted to hold a tire wheel in place while it is being removed from the wheel axle, comprising a frame, a set of swivelled rollers connected to said frame adapting said frame to be removed from said wheel axle, means in a form of an upright bar centrally positioned upon said frame having a slidable means associated therewith and adapted to be elevated into desired position, pivotable means associated with said slidable means, and tire wheel holding means rotatably connected with said pivotable means of said slidable means, so that the said tire wheel may be held suspended and rotated upon the said pivoting means, substantially as described.

3. In the apparatus of the class described adapted for removing the tire wheel off the wheel axle, a frame comprising a band, a cross bar member connected to said band, an upright center bar connected to said cross bar, a sleeve slidably associated with said center bar, a pivoting boss connected to said sleeve, means pivotally connected to said boss having a pair of arms hingedly connected thereto, a palm connected to the end of the said arm, and means adjustably operable, to hold said tire wheel in place and in position while said tire wheel is being removed from the wheel axle.

4. In the apparatus of the class described adapted for removing tire wheel off the wheel axle, comprising a band, cross bar means connected to said band adapted to hold it rigidly in place, a set of swivelled rollers connected to said band to adapt said apparatus to be wheeled into position, upright center bar means connected to said cross bar means adapated to centralize the load while said apparatus is in use, a sleeve slidably positioned upon said center bar means having a pivoting boss associated therewith, and clamping means pivotally connected to said pivoting boss of said sleeve, so that said tire wheel when held in place by means of the said clamping means, may be rotated into position upon the said wheel axle.

5. In the apparatus of the class described adapted for lifting and removing the tire wheel off the wheel axle, a frame, comprising a band, a plurality of swivelled rollers connected to said band adapting said apparatus to be wheeled when in use, a cross bar means connected to said band adapted to hold said band rigidly in position, a ledge member associated with said cross bar means, means centrally and uprightly connected to said cross bar means having a sleeve slidably associated therewith, a bracket connected to said sleeve adapted to engage the elevating device positioned upon the ledge of the said cross bar means, a pivoting boss means connected to said sleeve, and means pivotally associated with said pivoting boss to hold and adjust the tire wheel into position.

WILLIAM HENDRY.